United States Patent [19]

Collet

[11] Patent Number: 5,369,765
[45] Date of Patent: Nov. 29, 1994

[54] COMPOSITE SOFTWARE SYSTEM AND METHOD OF WRITING IT

[75] Inventor: Edouard Collet, Perros Guirec, France

[73] Assignee: Alcatel N.V., Amsterdam, Netherlands

[21] Appl. No.: 914,110

[22] Filed: Jul. 15, 1992

[30] Foreign Application Priority Data

Jul. 16, 1991 [FR] France ................................ 91 08986

[51] Int. Cl.⁵ ............................................. G06F 9/44
[52] U.S. Cl. ............................ 395/700; 364/DIG. 1; 364/254.4; 364/262.9
[58] Field of Search ............ 395/700, 500, 760; 364/DIG. 1

[56] References Cited

U.S. PATENT DOCUMENTS

| | | | |
|---|---|---|---|
| 4,622,633 | 11/1986 | Ceccon et al. | 364/DIG. 1 |
| 4,694,396 | 9/1987 | Weisshaar et al. | 364/DIG. 1 |
| 5,265,239 | 11/1993 | Ardolino | 395/500 |

FOREIGN PATENT DOCUMENTS

0-405 829   1/1991   European Pat. Off. .

OTHER PUBLICATIONS

Y. Ishakawa et al. "The Design of an Object Oriented Architecture", The 11th Annual International Symposium on Computer Architecture, 5 Jun. 1984, Ann Arbor, pp. 178–187.

K. W. Plessman et al. "Concurrent Object-Oriented Program Design in Real-Time Systems", Microprocessing and Microprogramming, vol. 24, No. 1–5, 1988, Amsterdam, pp. 257–265.

Shapiro et al., "SOS: Un Systeme D'Exploitation Reparti Fonde Sur Les Objects", Technique at Science Informatiques, 1987, pp. 166–169.

*Primary Examiner*—Thomas M. Heckler
*Attorney, Agent, or Firm*—Robbins, Berliner & Carson

[57] ABSTRACT

The components (1L) of a composite software system communicate using "external" messages. They execute operations instigated by the reception of such messages and leading to the sending of other such messages. Each component comprises a plurality of communication ports which communicate separately with the environment external to the component to receive and send external messages and which also exchange internal messages with a kernel (1N) of the component to have the kernel carry out at least some or some parts of these operations. A specific application is to implementing the software of a telecommunication network central office.

5 Claims, 4 Drawing Sheets

COMPOSITE SOFTWARE SYSTEM AND METHOD OF WRITING IT

TECHNICAL FIELD

The present invention concerns a software system. It is advantageously applied to writing a large software system, in other words a system comprising up to between $10^5$ and $10^6$ instructions in a high-level source language. It can be applied, for example, to writing a system for a central office in a telecommunication network.

BACKGROUND ART

The instructions of a system of this kind are written in a high-level language such as the language CHILL standardized by the CCITT. A system of this kind usually takes around 100 man-years to write. Once written, it is often necessary to modify it, for example to cater for new conditions. These changes can represent a significant fraction of the final total cost.

A known way of structuring software systems is to use a composite structure made up of software components. These components can be either "functional blocks" operating on external data or "objects" combining data and procedures using the data, for example. The CCITT SDL system and the ISO ESTELLE system are typical of systems using functional blocks. Each software component implements an assigned function. It may use another component to carry out some of the operations involved in that function. The components communicate with each other by means of messages.

In known systems writing and modification are difficult and costly because of the extent of interaction between the components, requiring a plurality of interfaces for each component.

DISCLOSURE OF INVENTION

One object of the present invention is to facilitate not only the writing of an efficient large software system but also its maintenance and evolution. A particular object of the invention is to facilitate the many test operations which accompany the operations of writing the system.

With these objects, the present invention consists in a composite software system comprising a plurality of software components communicating by means of "external" messages each component executing operations initiated by such messages received by said component, said system being characterized in that at least most of said components have a common structure whereby each standardized component (1L, FIG. 1) separately comprises:

a plurality of communication ports (1S1, . . . 1S4) respectively associated with a plurality of interfaces (I1, . . .I4) of said component, a kernel (1N) comprising background processing procedures and communicating with each port to execute background processing tasks requested by said port, and data modules (DS, DC) written and read by each port and said kernel, each said local external message (MRQ, FIG. 3) sent to a standardized component comprising not only the address of said component but also that of a port (2S2) of said component to which said message is specifically addressed, said port carrying out on said message interface processing optionally comprising the writing and/or reading of data in said data modules and constituting either full interface processing leading to the sending of an external message by said port or input interface processing leading to the sending of a centripetal internal message (N1.Ope.RQ) by said port to the kernel (1N) to request background processing tasks optionally comprising the writing and/or the reading of data in said data modules, said background processing leading to the sending of a centrifugal internal message (N1.Ope.CF) by said kernel to the various ports of said component, said message being of one of a plurality of types and comprising an indicator of its type, each port of said component being adapted to respond to messages that it receives by becoming selectively responsive to one type of centrifugal internal message and to respond to a centrifugal internal message of the type to which it is responsive by executing output interface processing leading to the sending of an external message (MCF) by said port.

These communication ports can typically have an individual size of between a few hundred and a few thousand instructions. They are sometimes referred to as hereinafter as "ports". Like the kernel, they are in the form of software modules.

A component typically comprises between $0.5 \times 10^4$ and $2 \times 10^4$ instructions. It is in the form of a "service provider". It exchanges external messages with other such components which it sees as "service providers" or "service users".

The use, in accordance with the invention, of components having a standardized modular structure facilitates their writing, verification and evolution.

BRIEF DESCRIPTION OF THE DRAWINGS

How the present invention may be put into effect will now be described by way of non-limiting example only with reference to the appended diagrammatic drawings which show components having a standardized structure in accordance with the present invention. Where like parts of different components are shown in more than one figure they are identified by the same reference symbol prefixed with numbers specific to the components.

BEST MODE FOR CARRYING OUT THE INVENTION

Figure 1:
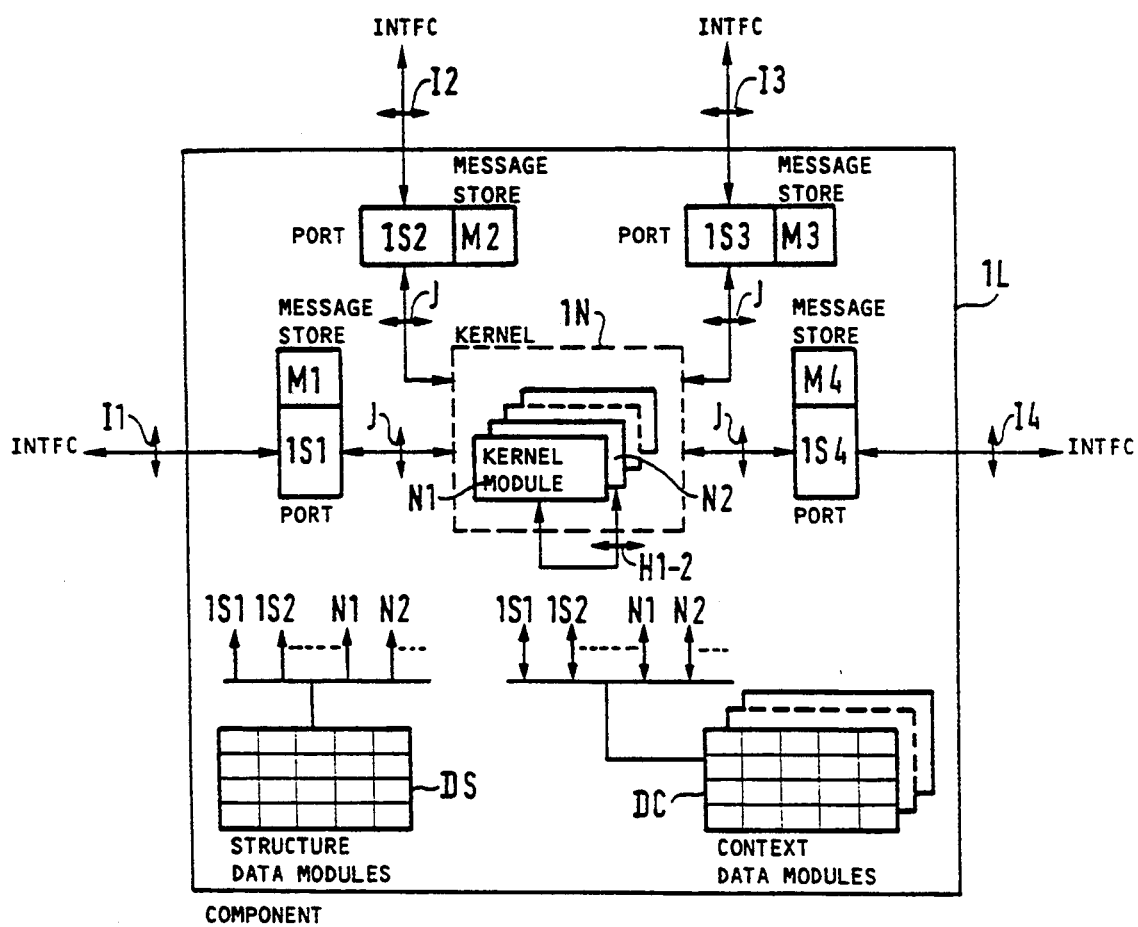
FIG. 1 shows a first component (for which said reference number prefix is 1) including all of the essential elements of a standardized structure in accordance with the invention.

Features common in terms of function to prior art software systems and a system in accordance with the present invention will first be described with reference to FIG. 1.

In terms of these common features, a software system is made up of instructions and data written in source language and then translated into machine language. In their source language form they are subdivided into a plurality of components. These software components have interfaces and ports associated with the interfaces. These communication ports are made up of interface processing procedures for sending and receiving local and non-local external messages. A local external message is sent by an originator component to a recipient component within the system. A non-local external message is exchanged with the environment external to the system.

Each component is designed to execute operations indicated by the external messages it receives, these operations comprising processing carried out within the component in response to external messages received and leading to the sending of other external messages. The set of operations executed by a component constitutes the function of the component and the set of functions of the components constitutes the function of the system.

In a system in accordance with the present invention most if not all of the components have the same standardized structure so that each such standardized component 1L separately comprises:

a plurality of communication ports 1S1 through 1S4 associated with respective interfaces I1 through I4 of the component, a kernel 1N made up of background processing procedures and communicating with each port to execute background processes requested by the port, and data modules DS, DC written and read by each port and the kernel. Each local external message to a standardized component comprises not only "parameters" representing data and the address of the component but also that of a port of the component to which the message is specifically addressed. This port applies to this message interface processing which may include the writing and/or reading of data in the data modules. In a few cases this processing may comprise full interface processing leading to the sending of an external message by the port but more typically it comprises input interface processing leading to the sending of a centripetal internal message by the port to the kernel to request execution of a background processing task. This background task may involve writing and/or reading data in the data modules. It leads to the sending of a centrifugal internal message from the kernel to the various ports of the component concerned. The message may be of any of several types and comprises an indication of its type. Each port of the component is adapted to become selectively responsive to one type of centrifugal internal message in response to messages that it receives. In this way it is enabled to respond to a centrifugal internal message by carrying out output interface processing leading to the sending of an external message via this port. To give a simple example of the role of the various ports, one communication port may be used to execute operations for which the component is designed, another to execute maintenance operations and a third to carry out traffic observation if the software system implements a central office in a telecommunication network. It is obvious that the processing carried out differs according to the communication port through which it is invoked.

The kernel 1N carries out background processing tasks collectively constituting the function(s) of the component. It comprises a plurality of kernel modules N1 through N3 carrying out respective background processing tasks. Each of these modules exchanges central internal messages with other like modules and centripetal and centrifugal internal messages with said communication ports.

The data modules comprise structure modules DS containing structure data describing the structure of the component and of the system which is only read (not written) by each port and the kernel of the component and context modules DC containing context data describing the evolution of operations effected by the component and by the system, the context data being written and read by each port and the kernel on the component.

Component interfaces I1 through I4 are associated with the ports 1S1 through 1S4 for communication with the environment external to the component 11. Each interface I2, etc of the component 1L defines communication between another component 1K2 seen as a user of the component 1L and a respective communication port 1S2 of the component 1L seen as a service provider. The component 1L is invoked from another component such as the component 1K2 by the sending of an external message from the component 1K2 to one of the ports, for example the port 1S2, of the component 1L using a communication protocol embodied in the respective interface I2. At interface level a communication protocol may be defined as a set of rules for constructing and processes for interpreting such messages, including the execution of communication actions requested by the content of the messages.

A subsidiary feature of the invention is that the communication protocol is embodied in the communication port of the service provider component to which a message is sent.

Interfaces internal to the component are also provided. Some, for example the internal interface H1-2, connect two kernel modules such as the modules N1 and N2. Others (not shown) connect these various units to the data modules DS and DC.

An interface J is specific to the kernel and used by the various ports. This means that communication between the various ports and the kernel is subject to common communication rules and that the ports provide any adaptation required between the various protocols of interfaces of the component and the kernel.

Each port and each module of the kernel is in the form of a finite state automaton.

Each port comprises message storage means M1 through M4 and can determine the status of the kernel of the component. If it receives an external message necessitating a background processing task it stores the message temporarily and sends an activity test centrifugal internal message to determine the kernel status to which the kernel responds by sending a status centrifugal internal message indicating its status. The port then sends a centripetal internal message to the kernel to request the background processing task only if the kernel is in a position to carry out the task. The operation of the component is therefore synchronous while that of the system is asynchronous.

External messages sent to the communication ports are processed by the ports each of which assumes responsibility for handling an incoming message.

This message handling entails carrying out on the message interface processing based on an analysis of the message and typically leading to the sending of an internal message to the component 1L, in which case this processing constitutes input interface processing. In this description this type of message is called a "centripetal internal message". It is typically in the form of a background processing instruction sent to the kernel N of the component to have it execute background processing on parameters that were contained in the external message received.

To go into more detail, a port such as the port 1S2, for example, is responsive to external and internal events and messages. On receiving an external message necessitating background processing in the kernel it first determines the status of the kernel and if appropriate the data module.

If the status is of the kind referred to as "in progress", in other words if the processing in question is already being executed in the kernel because another port has already requested it, the port 1S2 masks the receive message, in other words it awaits the result of this processing. At the same time it renders itself responsive to the type of centrifugal internal message which identifies the end of this processing so that it can use the result of this processing at the appropriate time.

If the kernel status is of the "idle" kind, however, in other words if the background processing can be done, then the port 1S2 requests the kernel to do it.

On receiving a centrifugal internal message to which it is responsive the port S2 applies output interface processing in order, for example, to send an external message.

Of course other situations can arise but they do not need to be described in order to obtain an understanding of the present invention.

To further facilitate the writing of a system instructions concerning the exchange of external messages such as MRQ and MCF (FIG. 3) and instructions concerning the exchange of internal messages such as N1.Ope.Rq and N1.Ope.CF are written using analogous naming rules for the various elements, either components and ports where external messages are concerned or kernel or data modules where internal messages are concerned. However, external users of the component know nothing else about the internal structure of the latter than that its various ports exist.

Examples of the operation of standardized components with a structure as just described will now be described.

Figure 2:
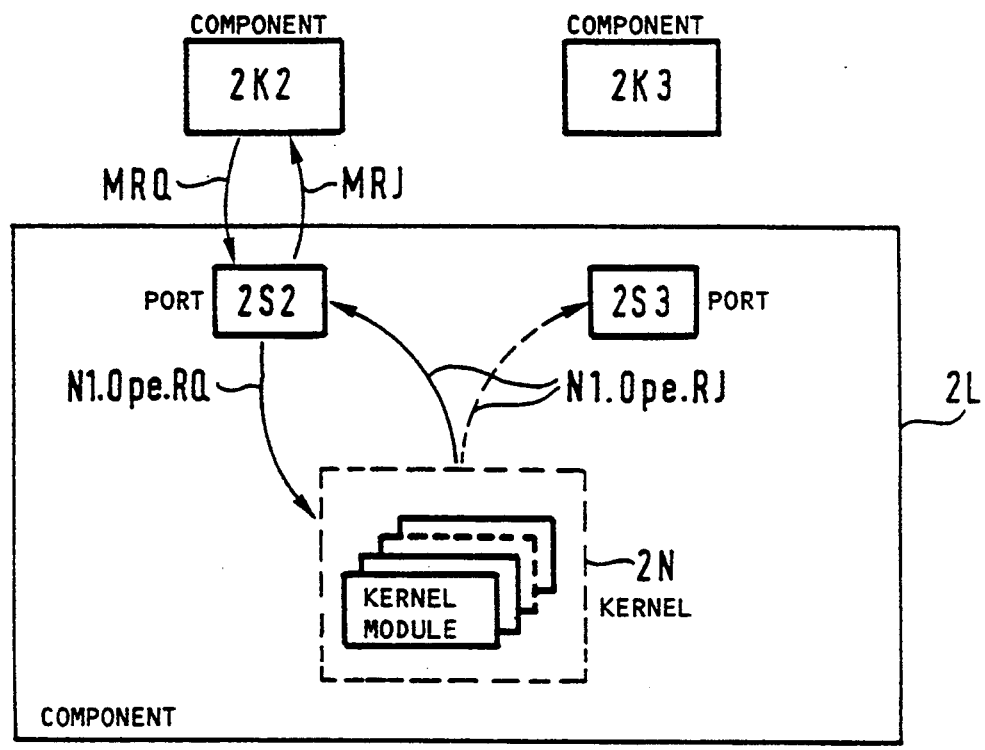
FIGS. 2 and 3 show part of a second component and the exchange of messages in two different situations (said reference number prefix is 2).
Figure 3:
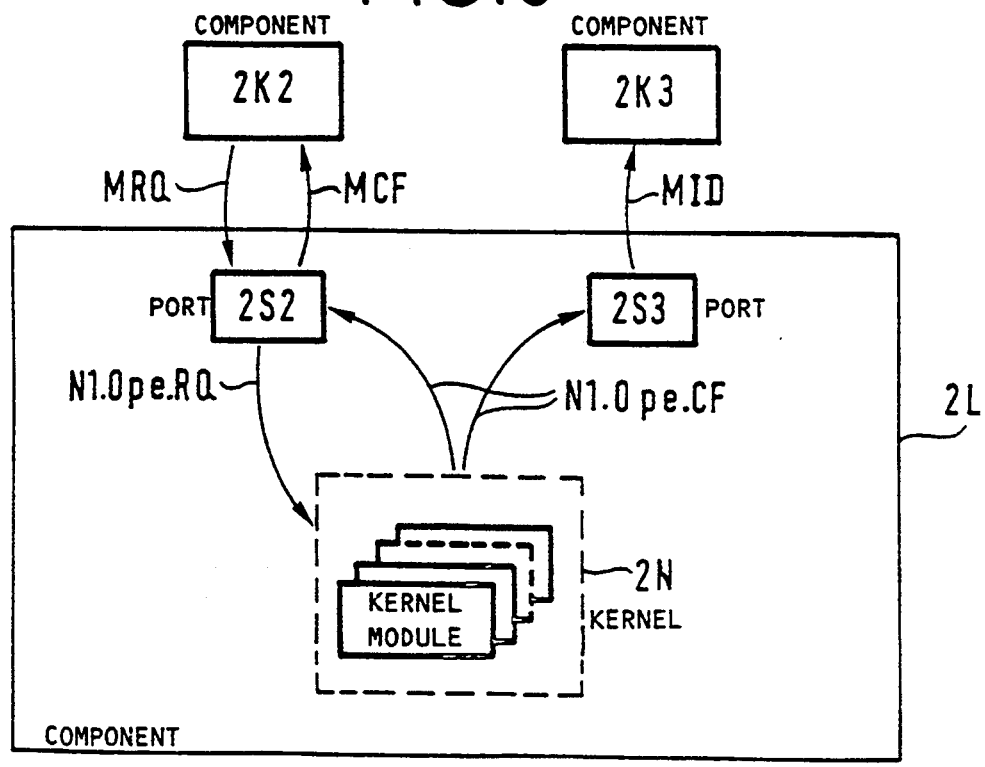

The component 2L shown in FIGS. 2 and 3 can operate in the mode referred to as "relay" mode at least in some cases. Its operation will be described in one such case. To this end and in the remainder of the description a conventional manner of designating internal messages will be used. An internal message is made up of three elements: kernel module ID, operation to be executed, request type (RQ=request, CF=confirmation, RJ=rejection, etc ):

a) Description of situation

An "external" message MRQ is sent by a user component 2K2 and received at the port 2S2. It initiates input interface processing which results in the sending of a centripetal internal message N1.Ope.RQ to a module of the kernel 2N.

If a processing problem is detected by the kernel and reported by a centrifugal internal message N1.Ope.RJ the component 2L must respond to the message MRQ received by sending a rejection external message MRJ. This is sent from the port 2S2 to the user 2K2 because this port was responsive to the N1.Ope.RJ type of internal message but the port 2S3 was not (see FIG. 2).

If processing is executed correctly the kernel responds with a centrifugal internal message N1.Ope.CF. An indicator external message MID is then sent from the port 2S3 to a user 2K3 and a confirmation message MCF is sent from the port 2S2 to the component 2K2. This is because both ports 2S2 and 2S3 were responsive to this type of internal message although they have different processing protocols.

b) Messages exchanged in the software component

The port 2S2 receives the external message MRQ.

The port 2S2 sends to the kernel the internal message N1.Ope.RQ (recipient N1, operation "Ope", request type "request").

The kernel processes this message

If there is a problem, the kernel responds with the message N1.Ope.RJ to the port 2S2 which sends the rejection external message MRJ.

If processing is executed correctly the kernel responds with the message N1.Ope.CF to the ports 2S2 and 2S3. The port 2S2 then sends a confirmation external message MCF to tell the component 2K2 that it has processed the message MRQ sent by the component 2K2. The port 2S3, which does not receive the message MRQ, sends to the component 2K3 an indicator external message MID to tell it that a message MRQ has been sent by another component 2K2 and processed by the component 2L.

Figure 4:
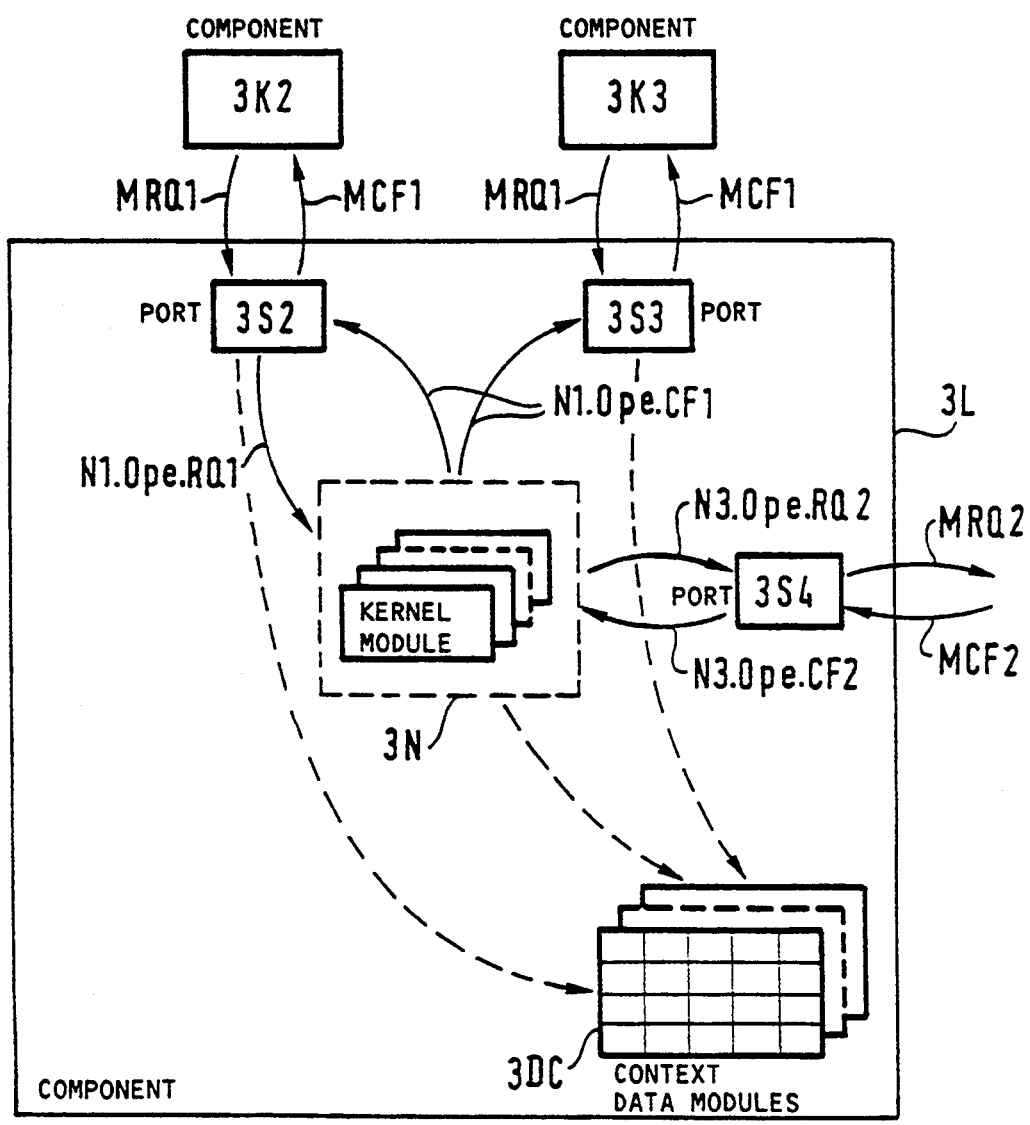
FIGS. 4 and 5 show parts of third and fourth components and the exchange of messages (said reference number prefix is respectively 3 and 4).

The component 3L in FIG. 4 is similar to the component 2L but its operation will be described in a situation which is slightly different from that previously described in that external messages cross over.

a) Description of situation

The same external message MRQ1 is received almost simultaneously but first by the port 3S2 and then by the port 3S3 of the component 3L. Processing of this message is requested virtually immediately by the port 3S2. The processing includes a wait state of the kernel 3N of the component. This wait state starts before the port 3S3 has received the message MRQ1, for example when the port 3S4 receives a centrifugal internal message N3.Ope.RQ2 from the kernel in the context of this processing and sends an external message MRQ2 and then awaits the response. This wait state ends after the port 3S3 receives the message MRQ1, for example, when the port 3S4 receives the expected response in the form of an external message MCF2 and sends it to the kernel in the form of an internal message N3.0pe.CF1. In this case the processing of the message MRQ1 must lead to the sending of two confirmation external messages MCF1 by the two ports 3S2 and 3S3 rather than the sending of an indicator message like the message MID of the previous situation.

b) Messages exchanged in the software component

The port 3S2 receives the external message MRQ1.

The port 3S2 tests the status of the kernel. The response is "idle". The port then sends a centrifugal internal message N1.Ope.RQ1 and renders itself responsive to the N1.Ope.CF1 message type which will constitute the result of this processing.

The kernel processes the message N1.Ope.RQ1, sends messages such as N3.Ope.RQ2 to the port 3S4 and goes to the wait state.

The port 3S3 receives the message MRQ1. It tests the status of the kernel. The response to this test is "in progress" which means that the appropriate processing has already been requested. The port therefore looks out for the end of this processing, in other words it also renders itself responsive to the N1.Ope.CF1 message type. After receiving messages such as N3.Ope.CF2 from the port 3S4 and completing the background processing the kernel 3N sends the message N1.Ope.CF1.

The ports 3S3 and 3S4 receive the message N1.Ope.CF1 and respond as follows:

The port 3S2 sends the external message MCF1.

The port 3S3 also sends the message MCF1 (it registered the "crossover" of the two messages MRQ1 and responds as if it alone receives the message).

The dashed lines in the figure show internal messages exchanged with the context module 3DC during the processing just described.

Figure 5:
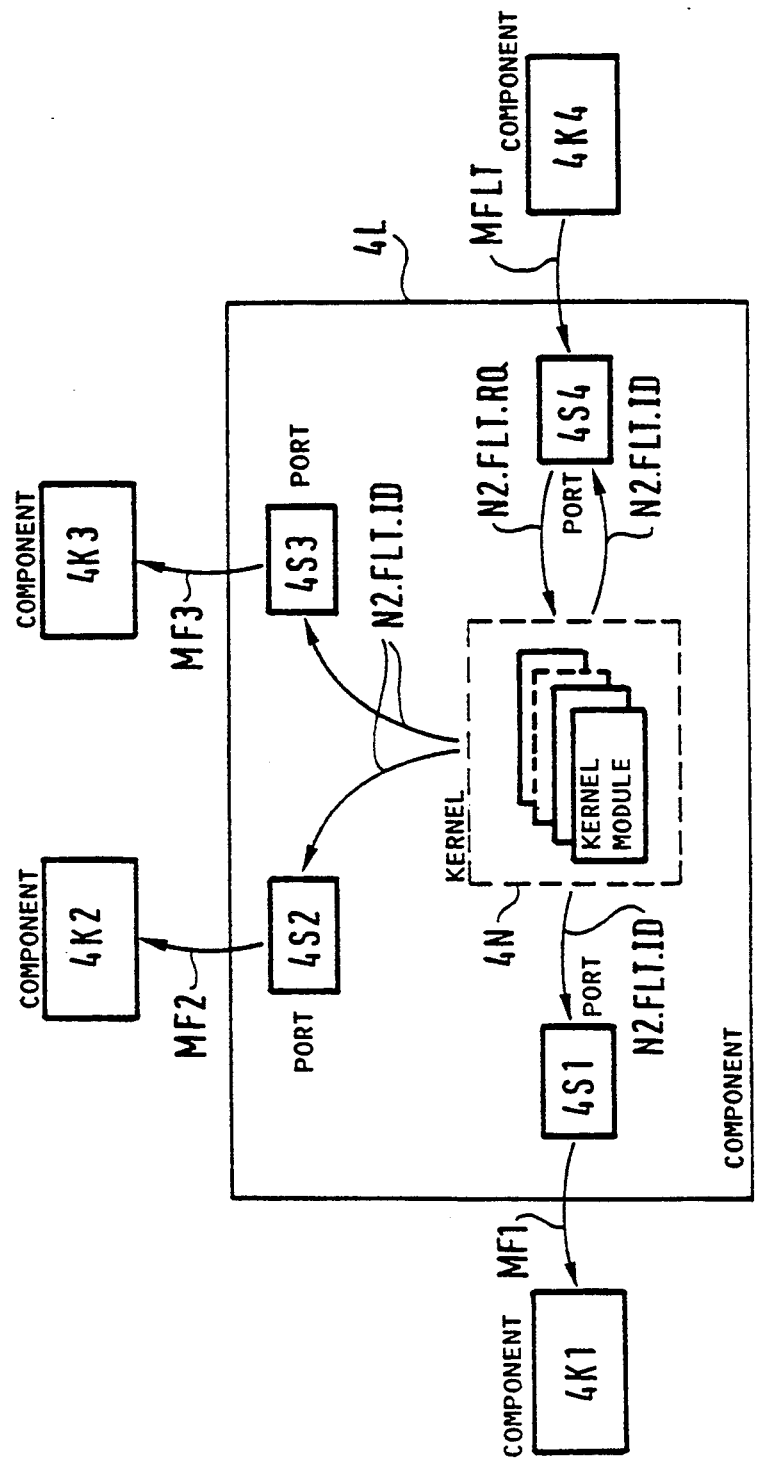

The fourth component 4L shown in FIG. 5 is used in a situation referred to as broadcasting internal to the component.

a) Description of situation

The port 4S4 receives an "external" message MFLT characteristic of malfunctioning of another component 4K4. This port then initiates processing which must result in release of the transaction concerned, in other words a halt and cancellation of processing already carried out in the context of this transaction. This processing must also lead to the sending of fault messages MF1, MF2, MF3 to other software components 4K1, 4K2, 4K3.

b) Messages exchanged in the software component

The port 4S4 receives the external message MFLT from the component 4K4.

It sends to the kernel 4N the centripetal internal message N2.FLT.RQ.

The kernel processes this message and releases the transaction concerned. It reports this by sending a centrifugal internal message N2.FLT.ID.

Each port 4S1, 4S2 and 4S3 is responsive to this message at all times. It reacts to the message and sends an external message specific to the protocol of the component interface associated with it, in other words the ports 4S1, 4S2 and 4S3 send fault messages MF1, MF2 and MF3 to the components 4K1, 4K2 and 4K3, respectively.

What is claimed is:

1. A composite software system comprising instructions and data written in source language for subsequent translation into machine language, wherein said instructions and data are grouped in said source language into a plurality of software components, each of said software components is associated with one or more respective interfaces, each of said interfaces is associated with one or more respective communication ports, each of said software components is made up of interface processing procedures for sending and receiving local and non-local external messages, each said local external message is sent by an originator component to a recipient component with the system, each said non-local external message is exchanged with an environment external to the system, each component executes operations indicated by the external messages received by said component, said operations including processing carried out within said component in response to said received external messages and leading to the sending of other external messages, all operations of a component define a respective function of said component, all functions of said components define a function of the system, at least a majority of said components are standardized components having a standardized structure such that each such standardized component comprises:

a plurality of communication ports respectively associated with a plurality of interfaces of said component, a kernel comprising background processing procedures and communicating with each port to execute background processing tasks requested by said port, and data modules written and read by each port and said kernel, each local external message sent to a standardized component comprises not only the address of said component but also that of a specific port of said component to which said message is specifically addressed, said specific port carries out, in response to said each local external message, interface processing optionally comprising the writing and/or reading of data in said data modules and constituting either full interface processing leading to the sending of an external message by said port or input interface processing leading to the sending of an incoming internal message by said port to the kernel to request background processing tasks, at least one of said background processing tasks comprises the writing and/or the reading of data in said data modules, said background processing task leads to the sending of an outgoing internal message by said kernel to the various ports of said component, said outgoing internal message is of one of a plurality of types and comprising an indicator of its type, each port of said component responds to messages that it receives by becoming selectively responsive to one type of outgoing internal message, and each port of said component responds to an outgoing internal message of the type to which it is responsive by executing output interface processing leading to the sending of an external message by said port.

2. A system according to claim 1 wherein each port of said standardized component comprises message storage means and is able to determine a current status of the kernel of said component, said port responds to an external message it receives by storing said message temporarily and sending an activity test incoming internal message to which said kernel responds by sending a status outgoing internal message indicating said current status, said port sends an incoming internal message to said kernel to request background processing of said external message only if said kernel is in a position to carry out such processing, operation of each said component is synchronous, and operation of said system is asynchronous.

3. A system according to claim 1 wherein said data modules comprise structure modules containing structure data describing the structure of said component and said system and which is only read by the ports and the kernel of said component, and context modules containing context data describing prior operations effected by said component and by said system and which is both written and read by the ports and the kernel of said component.

4. A system according to claim 1 wherein said kernel comprises a plurality of kernel modules respectively executing a plurality of background processing tasks, each of said modules exchanges central internal messages with others of said modules, and each of said modules exchanges incoming and outgoing internal message with said communication ports.

5. A system according to claim 4 wherein at least some of said kernel modules are each responsive

- to a halt instruction to interrupt processing in progress in said module and
- to a reset instruction to resume the processing interrupted in this way, and said halt and reset instructions are sent by communication ports and/or other kernel modules of the same component.

* * * * *